United States Patent
Alekseyev-Popov et al.

(10) Patent No.: US 8,023,195 B2
(45) Date of Patent: Sep. 20, 2011

(54) SPLIT LASER EYE PROTECTION SYSTEM

(75) Inventors: Andrey Vadimovich Alekseyev-Popov, Mount Kisco, NY (US); John Fernando Cueva, Danbury, CT (US)

(73) Assignee: Gentex Corporation, Carbondale, PA (US)

( * ) Notice: Subject to any disclaimer, the term of this patent is extended or adjusted under 35 U.S.C. 154(b) by 494 days.

(21) Appl. No.: 12/256,959

(22) Filed: Oct. 23, 2008

(65) Prior Publication Data

US 2011/0075265 A1   Mar. 31, 2011

(51) Int. Cl.
G02B 27/14 (2006.01)
H04N 7/00 (2011.01)

(52) U.S. Cl. .......................... 359/630; 348/115
(58) Field of Classification Search .................. 359/13, 359/630; 348/115
See application file for complete search history.

(56) References Cited

U.S. PATENT DOCUMENTS

| | | | |
|---|---|---|---|
| 3,923,370 A * | 12/1975 | Mostrom | 359/630 |
| 4,657,345 A | 4/1987 | Gordon | |
| 4,867,551 A | 9/1989 | Perera | |
| 5,343,313 A | 8/1994 | Fergason | |
| 5,584,073 A | 12/1996 | Radzelovage et al. | |
| 5,734,359 A | 3/1998 | van Hooreweder | |
| 6,411,451 B1 | 6/2002 | Fliss et al. | |
| 6,844,980 B2 | 1/2005 | He | |

FOREIGN PATENT DOCUMENTS

| | | |
|---|---|---|
| EP | 0182698 | 5/1986 |
| GB | 2265726 | 10/1993 |

OTHER PUBLICATIONS

International Search Report, mailed on Jun. 17, 2010 in connection with corresponding International Application No. PCT/US2009/060344.

* cited by examiner

Primary Examiner — William C Choi
(74) Attorney, Agent, or Firm — Design IP

(57) ABSTRACT

A laser eye protection (LEP) system for a helmet having a helmet-mounted display (HMD) system. The LEP system includes a large outer visor, which provides ballistic protection, LEP and a display surface for the HMD, and a smaller inner visor, which also provides LEP. LEP is split between the two visors, so that the outer visor can block light in a wavelength that overlaps with the peak wavelength range of the HMD without impairing the wearer's ability to view HMD imagery. The outer visor also preferably does not block near IR light, which allows image-enhancement devices to be positioned within the protective envelope of the outer visor while the smaller inner visor protects the wearer from near IR threats.

20 Claims, 7 Drawing Sheets

SPLIT LASER EYE PROTECTION SYSTEM

STATEMENT OF GOVERNMENT INTEREST

The U.S. Government has a paid-up license in this invention and the right in limited circumstances to require the patent owner to license others on reasonable terms as provided for by the terms of Contract Number N00421-04-D-0010 awarded by the Naval Air Warfare Center AD (PAX).

BACKGROUND AND FIELD OF INVENTION

The present invention relates to configuring laser eye protection to accommodate a helmet-mounted display (HMD). More particularly, it relates to selectively admitting desired wavelengths of an HMD in an inner layer while filtering dangerous laser radiation, of similar wavelengths, at an outer layer.

It is desirable to protect the eyes of aircrew from potential exposure to light radiation threats during flight. Such protection (commonly called "laser eye protection" or "LEP") has traditionally been incorporated into a single visor that is attached to an aircrew helmet. Because it is not feasible to provide LEP for all possible threats, the visor is typically designed to provide LEP for specific threats which are deemed most hazardous, based on the likelihood that the user will encounter the threat and the severity of injury caused by exposure to that threat. The group of wavelength bands for which a particular system provides protection will be referred to herein as an "LEP matrix."

Conventional LEP systems consist of one or more filter technologies incorporated into a single visor or lens for attenuating wavelength bands in the LEP matrix. Such filter technologies include sputtered dielectric stacks, holograms, polarizing filters, and absorber dyes.

Many modern aircraft also include heads-up display systems (HUD) and/or HMD systems, which provide aircrew with critical data, such as targeting information, aircraft information and enhanced images (e.g., night vision or infrared). Human visual acuity is keenest in the middle of the visible spectrum, which is at a wavelength of about 550 nm. Accordingly, many HUD and HMD display systems use light sources which generate light having wavelength bands that are close to 550 nm (e.g., having peak wavelengths in the range of 525 nm to 560 nm).

In the case of LEP systems which protect against visible threats, a conflict arises between the desire to minimize the intensity of threats that will reach the eyes of the person using the system and avoiding vision impairment on the visible spectrum. This problem is of particular concern for LEP systems in which any of the wavelength bands of the LEP matrix overlaps with one or more of the wavelength bands of the light sources for instrumentation, HUD, and HMD systems. Another problem with conventional LEP systems is that many filter technologies are expensive and/or difficult to incorporate into the large, highly curved visors commonly used on aircrew helmets.

U.S. Pat. No. 5,343,313 to Fergason discloses a helmet having a helmet mounted display system, two polarizing members and a liquid crystal cell located between the polarizing members. Attenuation or blocking of light is achieved by varying rotation of the plane of polarization of light passing through the liquid crystal cell. The HMD system projects onto a surface located between the polarizing members so that operability of the HMD is not impaired by the attenuation of the polarizing members. The eye-protection system disclosed in Fergason has several deficiencies, including an inability to block light threats in specific, narrow wavelength ranges without blocking light in other non-threat wavelength ranges. In addition, the eye protection system of Fergason requires the cooperation of at least three different components to attenuate or block light.

U.S. Pat. No. 5,584,073, to Radzelovage, discloses a helmet system having a display that is projected onto the inside of a visor, where the visor provides laser eye protection.

U.S. Pat. No. 6,411,451, to Fliss, et al., discloses a narrow-bandwidth interference filter in combination with an image intensifier. In Fliss, a filter is placed in front of an image intensifier to provide protection against laser radiation. The image intensifier then amplifies the filtered light to acceptable levels for viewing by the user.

U.S. Pat. No. 6,844,980, to He, describes a HUD or HMD where the reflectivity of a display surface located on the inside surface of a visor can be varied by applying an electrical field to the display surface.

SUMMARY OF THE INVENTION

In one respect, the invention comprises an apparatus for use with a head-mounted device having an image projection device for displaying an image in the visual field of a user, the user having a head and eyes, the image projection device being adapted to emit light having a peak wavelength range and a FWHM wavelength range, the apparatus comprising: a first visor including an inner surface and a display surface located on the inner surface, the first visor having a transmittance of less than 1% for light in a first wavelength range, the first wavelength range overlapping with the FWHM wavelength range, the first visor having a deployed position in which the display surface is positioned at least partially within the visual field of the user and is positioned to reflect light emitted from the image projection device, the inner surface facing the eyes of the user when the first visor is in the deployed position; and a second visor having a deployed position in which the second visor is positioned at least partially within the visual field of the user and the second visor is positioned between the first visor and the eyes of the user, the second visor having a transmittance of less than 1% for each of a first group of at least one light radiation threat and having an integrated luminous transmittance of at least 20% for light emitted by the image projection device.

In another respect, the invention comprises an apparatus for use with a headwear-mounted device for displaying an image in the visual field of a user, the user having a head and eyes, the apparatus comprising: a first visor having a deployed position in which the headwear is positioned on the head of the user and at least partially within the visual field of the user, the first visor having a transmittance of at least 50% for light in the near infrared wavelength range; and a second visor having a deployed position in which the headwear is positioned on the head of the user, the second visor is positioned at least partially within the visual field of the user, and the second visor is positioned between the first visor and the eyes of the user, the second visor having a transmittance of less than 1% for light in at least a portion of the near infrared wavelength range.

In yet another respect, the invention comprises a head-mounted apparatus for displaying an image in the visual field of a user, the user having a head and eyes, the apparatus comprising: a first visor having a deployed position in which the headwear is positioned on the head of the user, the display surface is positioned at least partially within the visual field of the user, the inner surface facing the eyes of the user when the first visor is in the deployed position;

a head-mounted display system that is adapted to emit light having a peak wavelength range and to generate images that are visible to the eyes of the user; and a second visor having a deployed position in which the headwear is positioned on the head of the user, the second visor is positioned at least partially within the visual field of the user, and the second visor is positioned between the first visor and the eyes of the user; wherein at least 99% of light in an LEP matrix is filtered by at least one of the first and second visors, the LEP matrix including a first wavelength range, the first wavelength range having an overlapping portion that overlaps with the peak wavelength range of the head-mounted display system, the second visor having an integrated luminous transmittance of at least 20% for the light emitted by the head-mounted display system.

BRIEF DESCRIPTION OF THE DRAWINGS

In the drawings wherein like reference numerals denote similar components throughout the views.

DETAILED DESCRIPTION OF THE PREFERRED EMBODIMENT(S)

For the purposes of this application, the term "light radiation threat" (or simply "threat") means a light source that could potentially injure a human eye and/or interfere with the vision of a person exposed to the light source.

For the purposes of this application, the term "block" means to filter out at least 99% of light in a particular wavelength range.

For the purposes of this application, the term "in-band" means light that is visible to the human eye (typically including wavelengths in the range of 380 nm-750 nm) and "out of band" means light that is not visible to the human eye.

For the purposes of this application, the term "near IR" or "near infrared" means light in the wavelength range from 750 nm-1000 nm.

For the purposes of this application, the term "headwear" means any device that is designed to be worn on the head of a person, including, but not limited to, helmets, hats, headbands, and eyeglasses. The term "eyeglasses" means any type of eyewear, including, but not limited to, spectacles and goggles.

Figure 1:
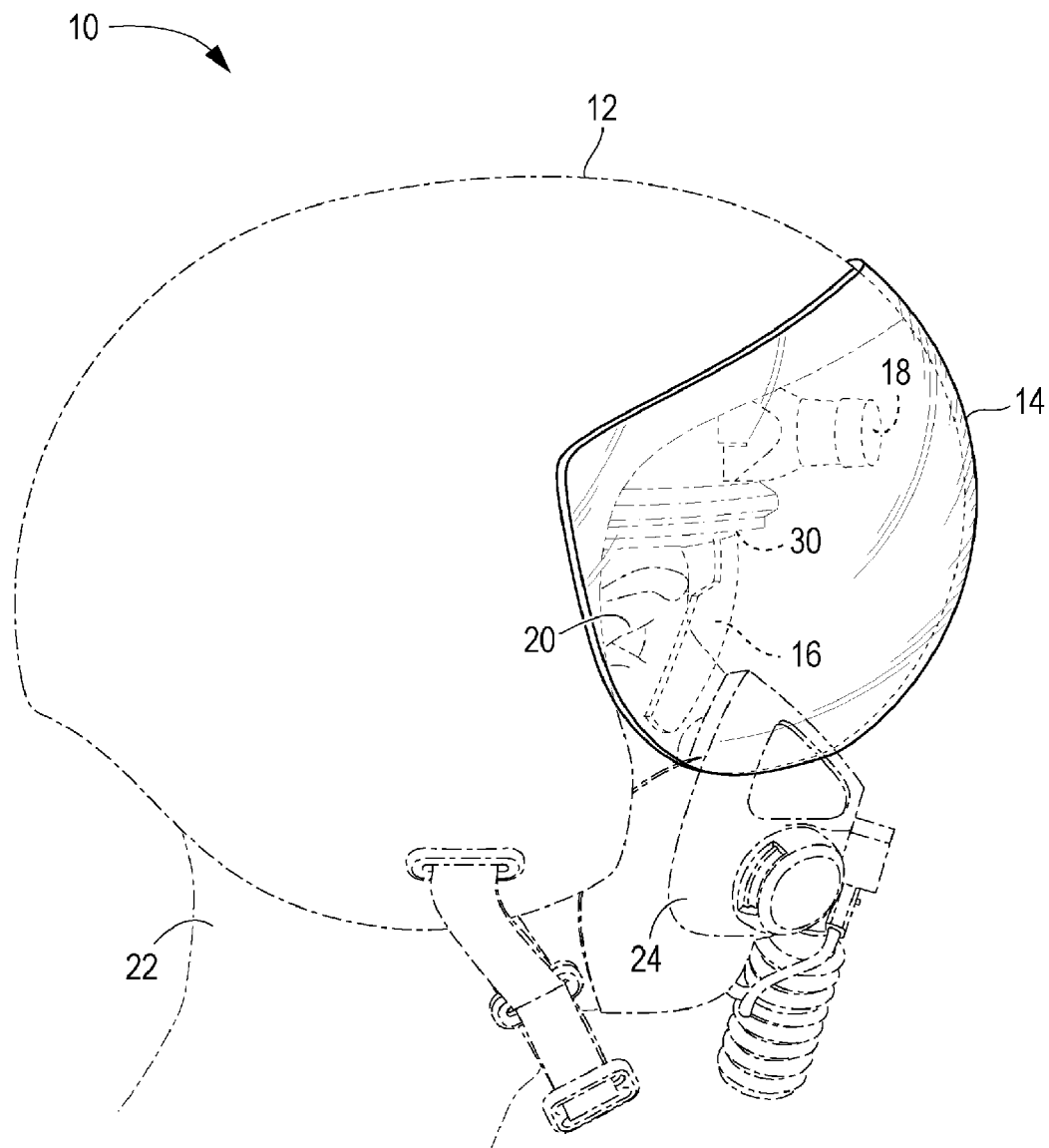
FIG. 1 is a left side view of a helmet system which incorporates the present invention.
Figure 2:
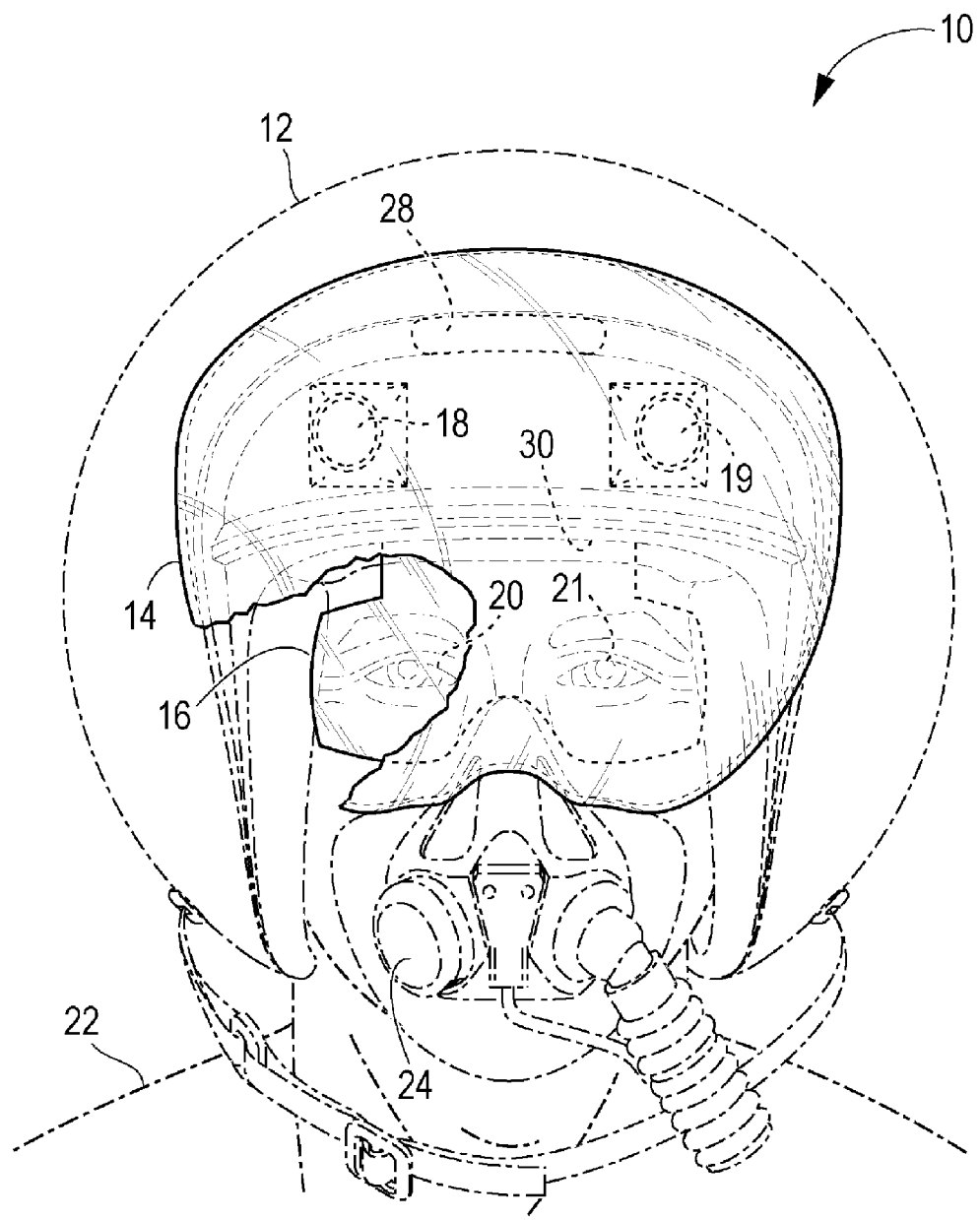
FIG. 2 is a front view thereof.

The present invention comprises a helmet system in which laser eye protection is split between two visors. An embodiment of the present invention is shown in FIGS. 1 and 2, in which reference numeral 10 refers generally to a helmet system which incorporates the features of the present invention. The helmet system 10 includes a helmet 12, an outer visor 14, and an inner visor 16.

In this embodiment, the outer visor 14 performs several functions, including vision enhancement, LEP, ultraviolet protection, ballistic protection, and providing a surface for the display of HMD images. The base component of the outer visor 14 is preferably a resin material, for example, polycarbonate. The outer visor 14 may include one or more coatings on its inner and/or outer surface. For example, an anti-reflective coating may be provided. In this embodiment, LEP is provided by one or more absorber dyes, which are preferably compounded into the resin material of the outer visor 14. Examples of suitable absorber dyes include FILTRON® brand absorber dyes, produced by Gentex Corporation.

The outer visor 14 preferably has a deployed position (shown in FIGS. 1 and 2), in which the outer visor 14 is positioned in front of the eyes 20, 21 of the wearer, and a stowed position (not shown), in which the outer visor 14 is pivoted up and away from the eyes 20, 21 of the wearer. When the outer visor 14 is in the deployed position, it preferably covers substantially all of the field of view of the eyes 20, 21 of the wearer. In order to enable HMD images to be viewed clearly, as well as to accommodate other components of the helmet system 10, there is a substantial amount of space between the eyes 20, 21 and outer visor 14.

The outer visor 14 is preferably contoured to provide a concave display surface 26 (see FIGS. 3 and 4) at a location that will reflect and direct imagery from the HMD system to the crew members' eyes. As can be seen in FIGS. 1 and 2, the outer visor 14 is large and highly curved, in order to occupy substantially all of the wearer's field of view. In this embodiment, the minimum radius of curvature of the outer visor 14 is in the range of 100-140 mm.

The inner visor 16 is preferably located within the envelope of the outer visor 14 and much closer to the eyes 20, 21 of the wearer. The base component of the inner visor 16 is preferably a resin material, for example, polycarbonate. In this embodiment, the inner visor 16 is attached to the brow edge 30 of the helmet 12.

Figure 3:
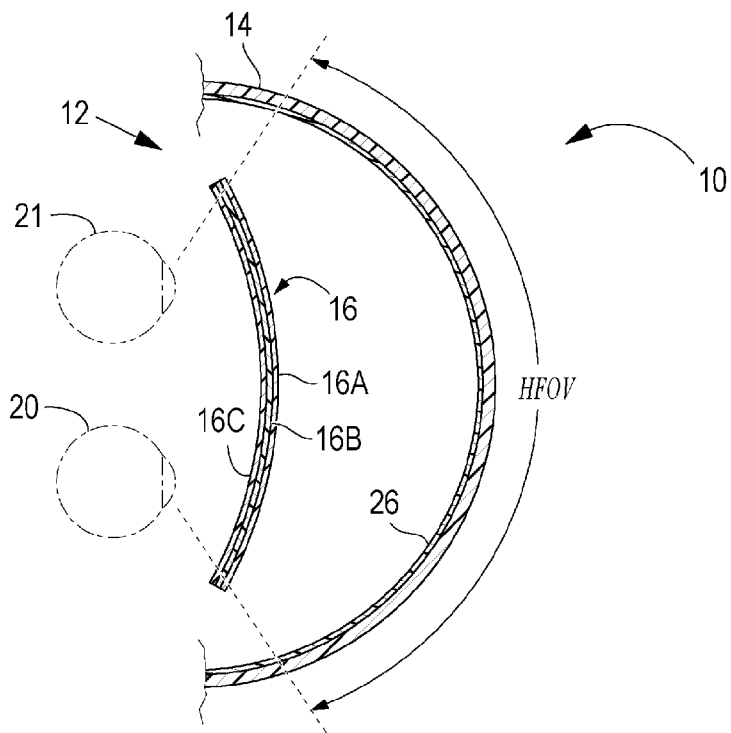
FIG. 3 is a top view showing a schematic representation of the inner and outer visors of one embodiment of the present invention.
Figure 4:
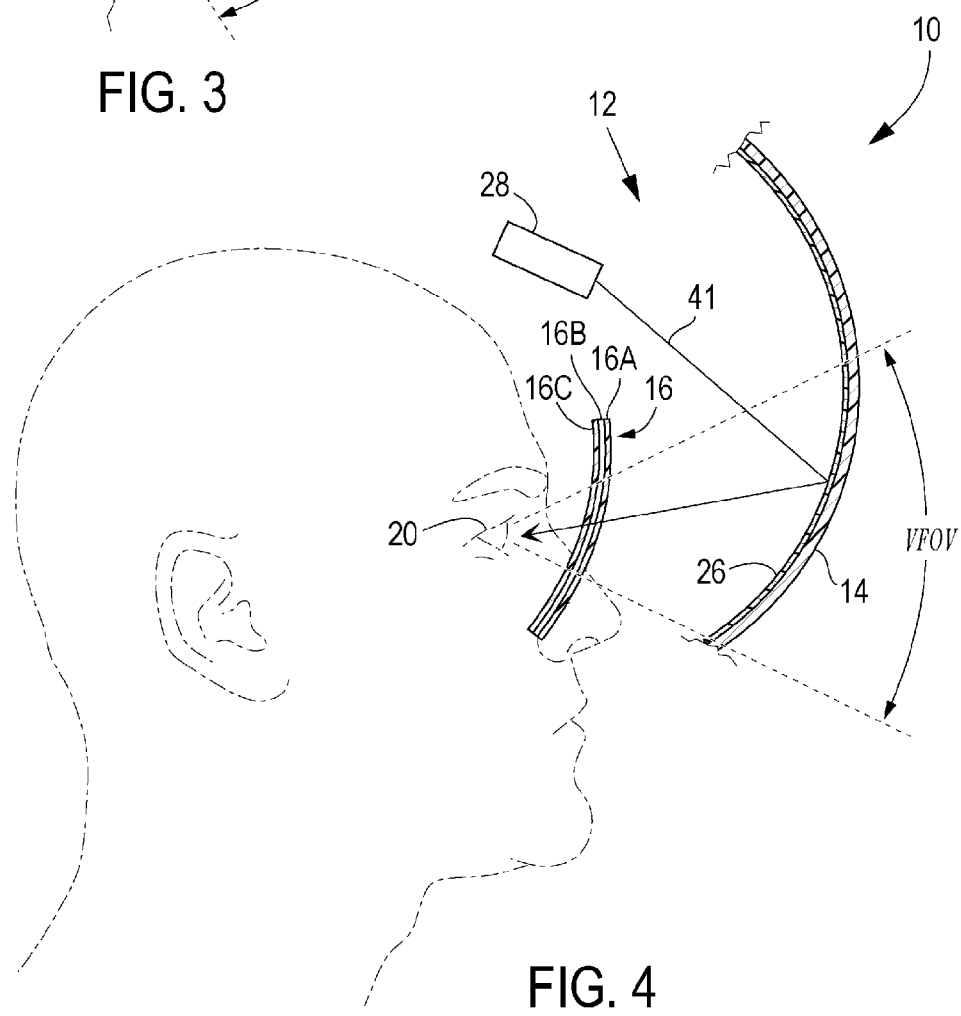
FIG. 4 is a left side view thereof.

Compared to the outer visor 14, the inner visor 16 provides a smaller, more manageable surface area. The size and configuration of the inner visor 16, which is on the order of 18 cm by 10 cm, makes it a much more suitable platform in which to incorporate surface applied filter technologies, for example, multi-layer dielectric filters and holograms. The larger surface area of the outer visor 14, which is on the order of 23 cm by 18 cm, creates difficulties in applying sputtered dielectric stacks, and is susceptible to delamination under the varying pressure and temperature conditions to which the outer visor is likely to be exposed. Referring to FIGS. 3 and 4, the inner visor 16 will often comprise several sandwiched layers 16A, 16B, 16C, each of which incorporates a different filter technology.

In alternate embodiments, different filtering technologies and/or different numbers of layers could be used. In addition, the inner visor 16 could be incorporated into a pair of eyeglasses, instead of being attached to the helmet 12. For example, goggles could be used, according to the description in U.S. Pat. No. 6,637,877, which is incorporated herein by reference in its entirety as if fully set forth.

It is important to note that the transmittance characteristics of the outer visor 14 preferably do not depend upon the position or orientation of the inner visor 16, and vice versa. Accordingly, the LEP performance of the present invention does not depend upon the relative location and/or orientation of the outer and inner visors 14, 16, which allows for more flexibility in design and implementation of the present invention.

Referring to FIG. 4, this embodiment includes an HMD system which projects light onto a display surface 26 located on the inner surface of the outer visor 14. The display surface 26 reflects the light from the HMD toward the wearer's eyes 20, 21. Any suitable HMD light source and optical assembly could be used to project the desired display information onto the display surface 26. In this embodiment, the HMD uses an LED-based light source that projects images and information onto the display surface 26 through a lens 28. The general path of light from the lens 28 to the eye 20 is depicted by line 41.

Referring again to FIGS. 1 and 2, this embodiment of the helmet 12 also includes two day/night image enhancing cameras 18, 19 (hereinafter "day/night cameras") mounted on the helmet 12, preferably above the brow edge 30. The day/night cameras 18, 19 are preferably located outboard of the inner visor 16 but behind (inboard of) the outer visor 14. This means that the outer visor 14 will occupy the field of view of the day/night cameras 18, 19. Image data from the day/night cameras 18, 19 is processed and displayed by the HMD system.

Positioning of the day/night cameras 18, 19 inboard of the outer visor 14 is preferable to positioning outside (outboard) of the outer visor 14 (as in the prior art) because it allows the day/night cameras 18, 19 to be positioned closer to the eyes 20, 21 and enables the horizontal distance between the day/night cameras 18,19 to be closer to a typical pupil distance for the eyes 20, 21. Both of these improvements enable greater accuracy of image-enhanced data displayed by the HMD system and HMD viewing comfort for the user.

Figure 8:
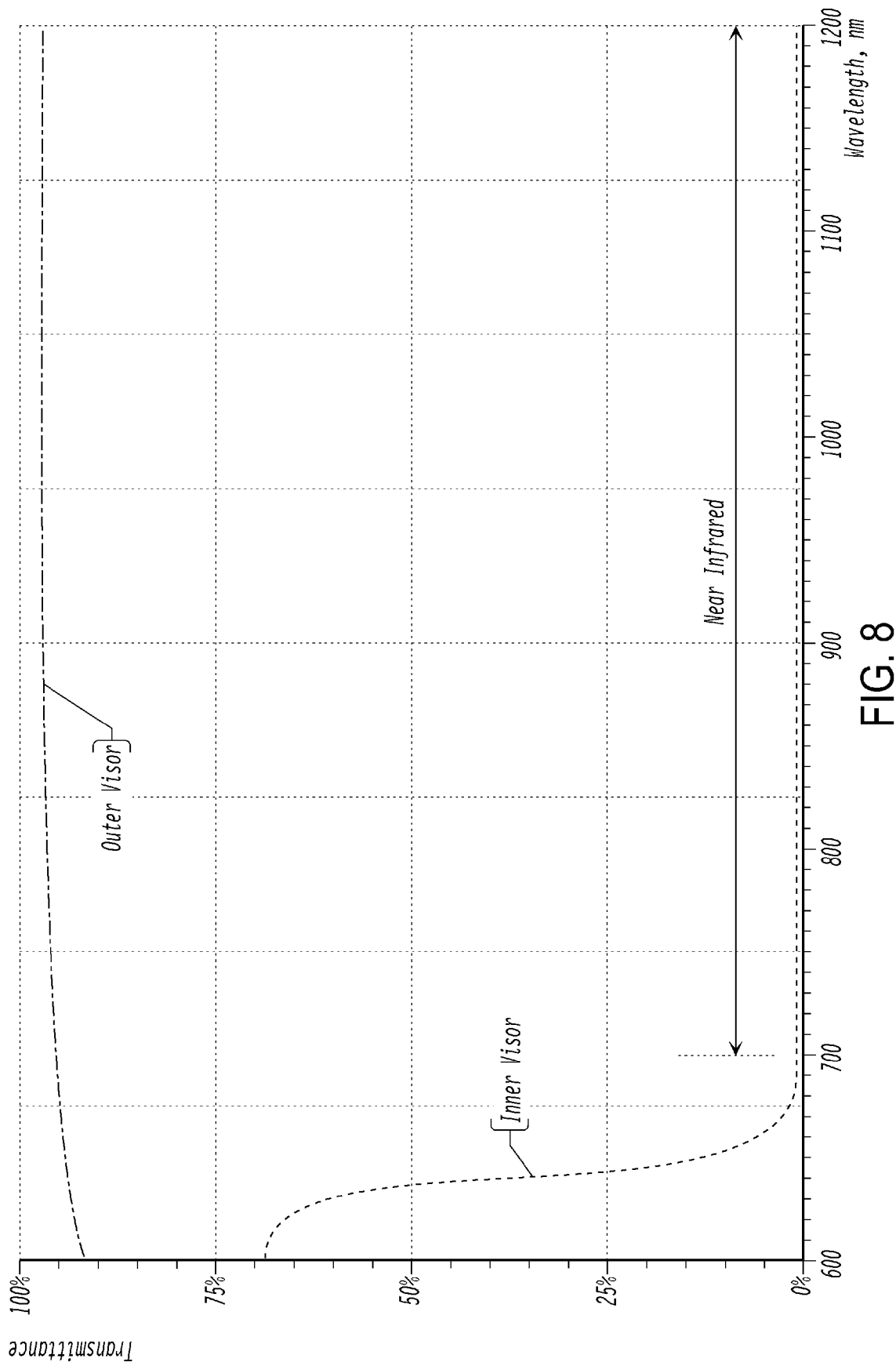
FIG. 8 is a graph showing the inner and outer visor transmittance curves for near IR light.

Referring to FIG. 8, the day/night cameras 18, 19 generate enhanced image data using light at wavelengths that is primarily above 600 nm. Light sensitivity levels of most active image enhancement cameras, including day/night cameras 18, 19, are highest in the near infrared wavelength range. The outer visor 14 preferably has high transmittance (preferably at least 50% and, more preferably, at least 90%) in the near infrared wavelength range in order to avoid impairing performance of the day/night cameras 18, 19. In addition, it is preferable that this area of high transmittance extend beyond the near IR wavelength range, as defined herein, to include the wavelength range of 700 nm-1200 nm (this more expansive definition of near IR is reflected in FIG. 8). In embodiments in which other types of image enhancement devices (having different operational wavelength ranges) are located inboard of the outer visor 14, it is preferable that the outer visor 14 have sufficient transmittance in throughout the operational wavelength range of the image enhancement devices so as to avoid impairing performance thereof.

In many applications, however, it is desirable to provide eye protection against threats in the near infrared range. Protection against threats in the near infrared range and above is preferably provided by the inner visor 16 only. Accordingly, the split LEP design of the present invention enables the day/night cameras 18, 19, or any other type of active image enhancement camera, to be positioned inboard of the outer visor 14, while also providing protection against threats in the near infrared range.

In this embodiment, the inner visor 16 provides transmittance of about 70% for light in the wavelength range from 550 nm to about 650 nm, then drops steeply to a transmittance of less than 1% transmittance for light in the wavelength range from 650 nm to at least 1200 nm. The outer visor 14 provides at least 90% transmittance in the wavelength range from 700 nm to at least 1200 nm.

In addition to enabling use of a wider variety of filter technologies, splitting LEP between two visors, which each independently provide LEP for particular wavelength ranges, enables the LEP matrix to include wavelength ranges which overlap with the peak wavelength range of the HMD system. For the purposes of this application, the term "peak transmission range" is intended to have a similar meaning to the term "full width at half maximum" (FWHM), except that "peak transmission range" includes only the wavelengths representing a minimum of 80% of the maximum transmittance, instead of the wavelengths representing a minimum of 50% of the maximum transmittance.

Figure 5:
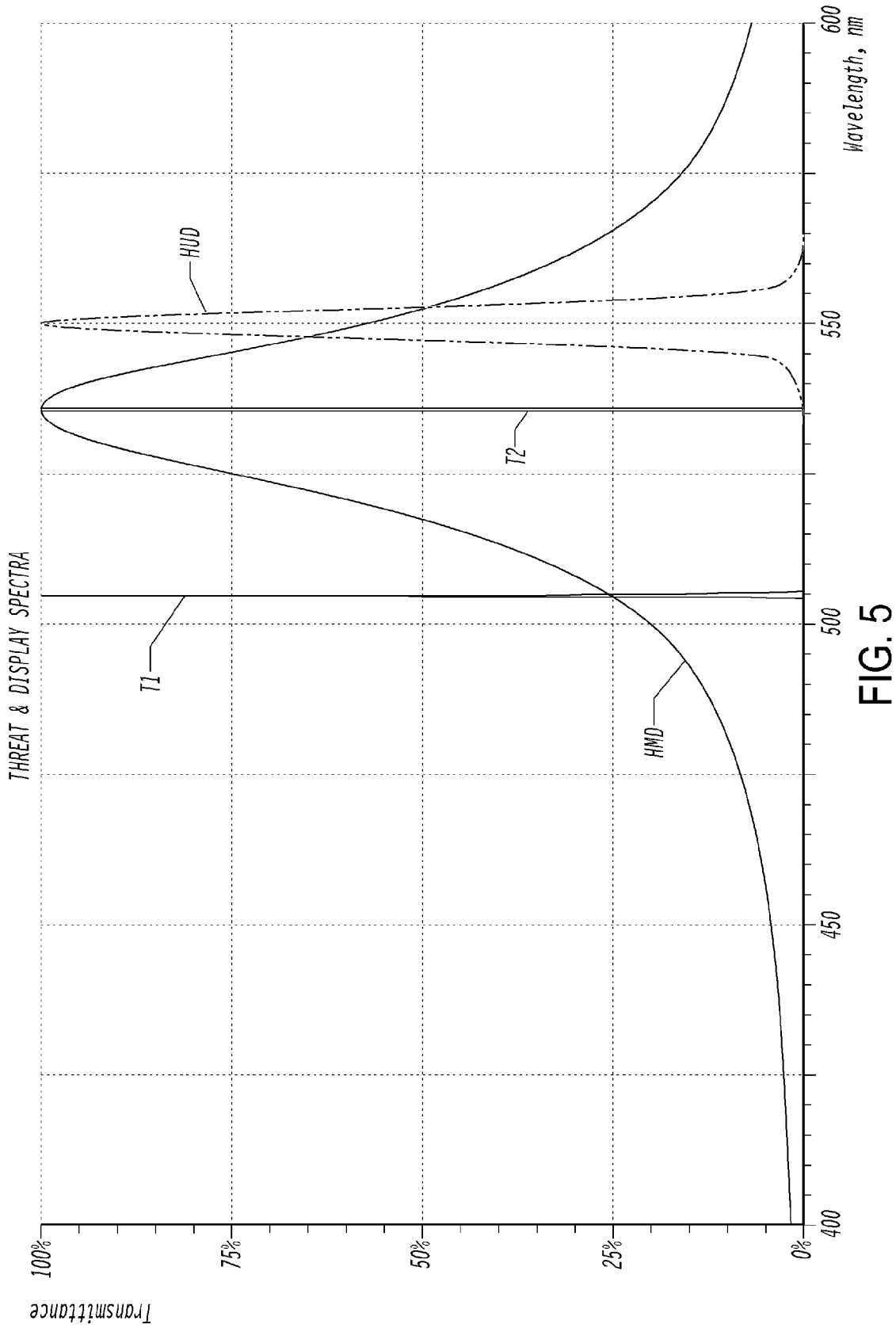
FIG. 5 is a graph showing exemplary emission curves for two threats from an LEP matrix and emission curves from one embodiment of an HMD and HUD.

An example of such overlap is shown in FIG. 5. The exemplary HMD system (labeled "HMD" in FIG. 5) uses a light source having a relatively wide bell-shaped emission curve that peaks at about 535 nm and has a peak wavelength range from about 525 nm to about 545 nm. The HUD system (labeled "HUD" in FIG. 5) uses a light source which has a narrow emission curve that peaks at a wavelength of about 550 nm. The LEP matrix includes two example threats, T1 at 505 nm and T2 at 536 nm. As can be seen in FIG. 5, the wavelength of the T2 threat is very close to the peak of the emission curve for the HMD system, and is within both the peak wavelength range and FWHM wavelength range for light emitted by the HMD system.

Figure 6:
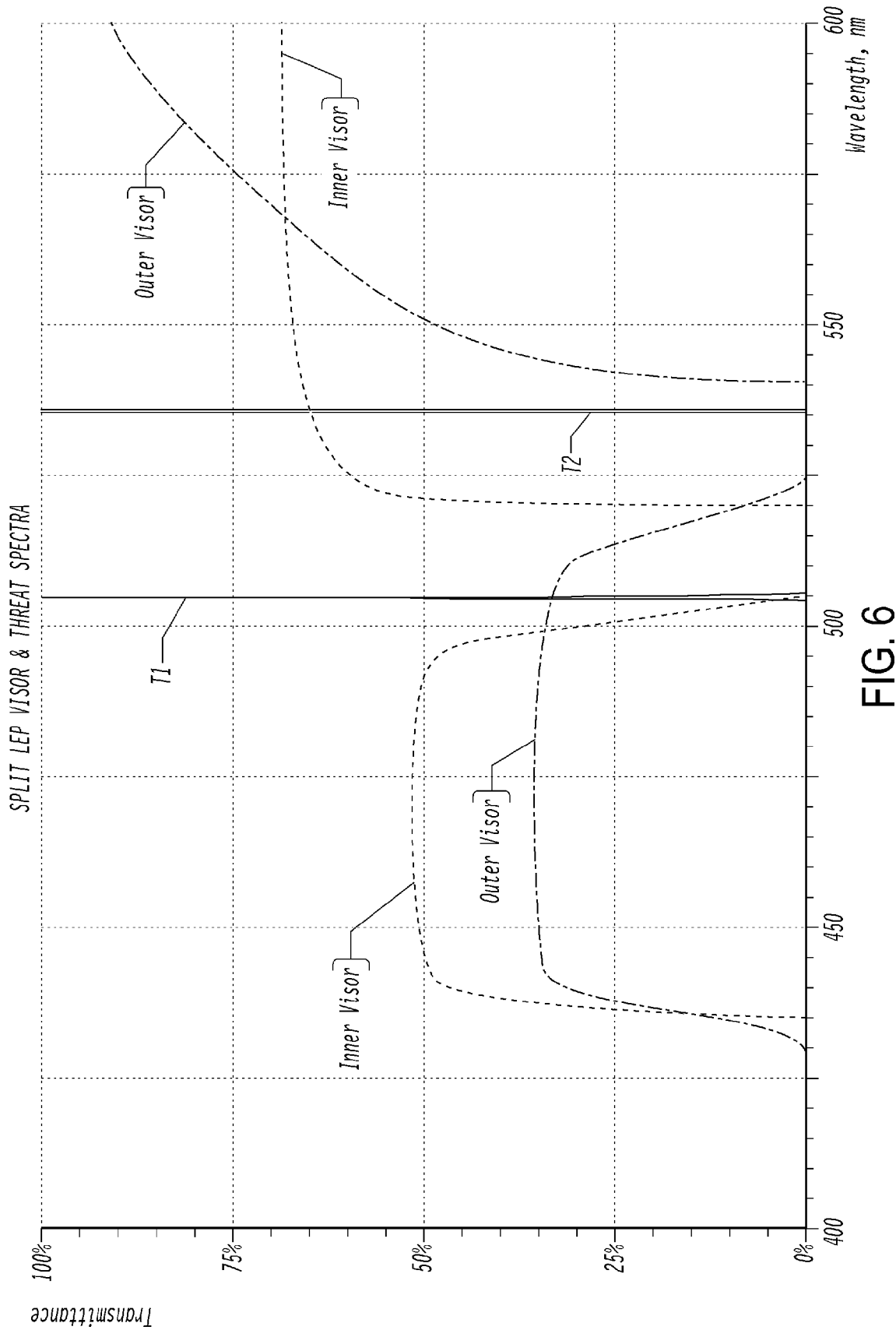
FIG. 6 is a graph showing the threat emission curves from FIG. 5 and transmittance curves for one embodiment of inner and outer visors.

FIG. 6 shows the LEP matrix and the transmission curves of one embodiment of the outer visor 14 and the inner visor 16. In order to block the T2 threat, while still providing an acceptable transmittance to the wearer's eyes for the HMD display image, the outer visor 14 is configured to block the T2 threat, while the inner visor 16 is configured to allow relatively high transmittance of the wavelength range for the T2 threat and peak wavelength range of the HMD transmission curve. The T1 threat is blocked by the inner visor 16.

The transmission curve of the inner visor 16 provides for about 50% transmittance of light in the wavelength range from about 435 nm to about 495 nm, at which point there is a steep drop in transmittance. Transmittance is less than 1% in the wavelength range from about 505 nm to about 520 nm (in order to block the T1 threat), climbs very steeply to about 55% transmittance in the wavelength range from about 520 nm to 525 nm, then transitions to a much more gradual increase in transmittance from about 65% to about 70% from about 535 nm to the right edge of the graph.

The transmission curve of the outer visor 14 provides for about 30% transmittance for light in the wavelength range from about 440 nm to about 510 nm, at which point there is a steep drop in transmittance. Transmittance is less than 1% in the wavelength range from about 525 nm to about 540 nm (in order to block the T2 threat at 536 nm), then climbs steeply to at about 50% transmittance at about 550 nm, about 75% transmittance in the wavelength range of about 575 nm and about 90% transmittance at the right edge of the graph (about 600 nm).

Figure 7:
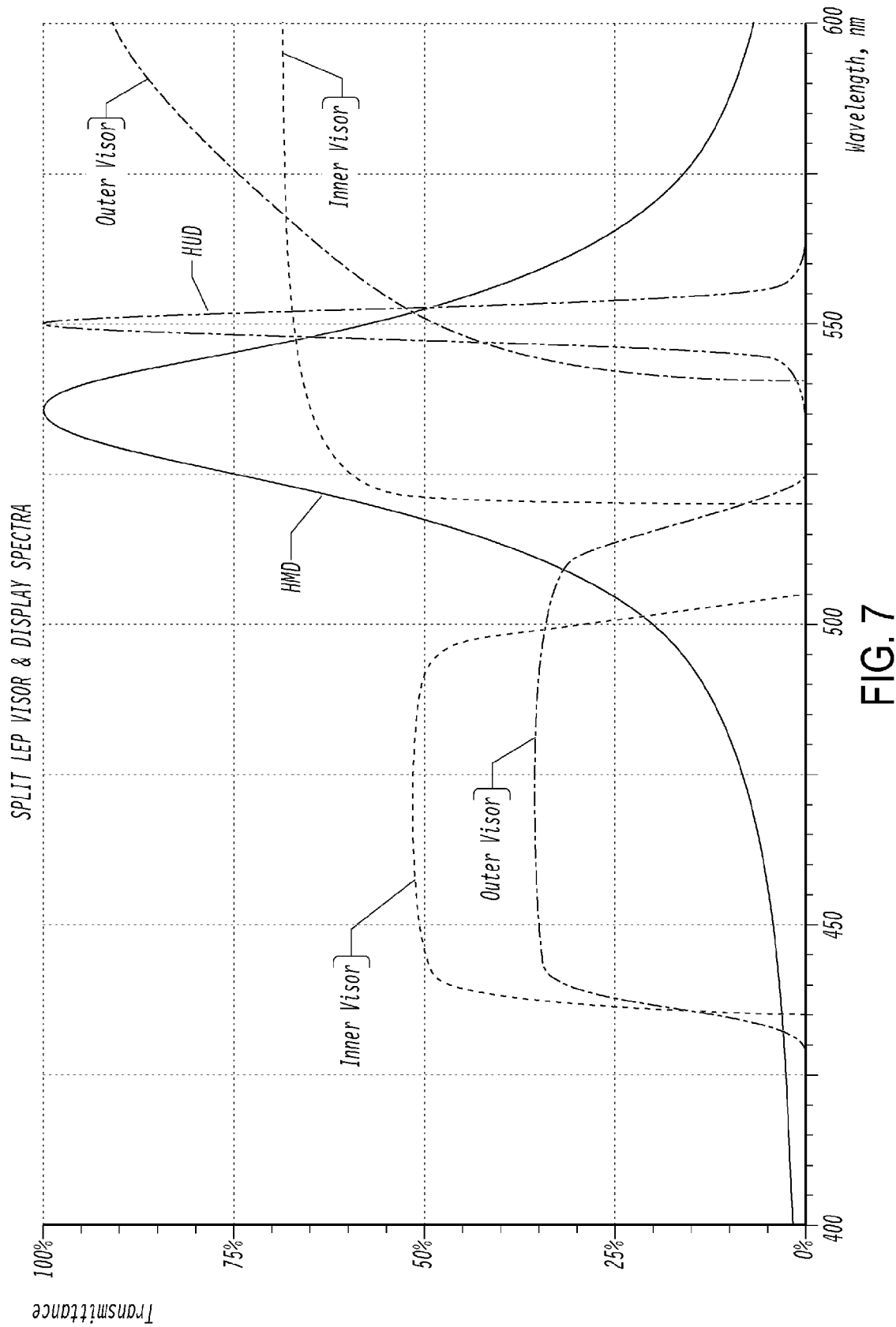
FIG. 7 is graph showing the inner and outer visor transmittance curves from FIG. 6 and the HMD and HUD emission curves from FIG. 5.

FIG. 7 shows the transmission curves of the inner and outer visors 16, 14 and the emission curves of the HMD and HUD systems. Notably, the outer and inner visors 14, 16 together provide an integrated luminance transmittance of at least 20% (more preferably at least 30%) for HUD light source emissions, which enables the wearer to see the HUD. In addition, the inner visor 16 provides an integrated luminous transmittance of at least 20% (more preferably at least 30%) for the HMD emission curve. "Integrated luminous transmittance" ($T_p$) is calculated using the following equation:

$$T_p = \frac{\sum_{\lambda=380}^{760} T * E_{NW}}{\sum_{\lambda=380}^{760} E_{NW}} \qquad 5$$

where "T" is the transmittance of the object(s) in question (either the outer visor 14, the inner visor 16, or both) and $E_{NW}$ is the normalized weight value for the light source in question (either the HMD or HUD).

It should be noted that the transmission curves of the inner and outer visor 16, 14, the emission curves of the HMD and HUD light sources, and the threats shown in FIGS. 5 through 8 have been altered from the actual curves and data used in the applicants' preferred embodiment because such information is classified as of the filing date of this application. The data provided in FIGS. 5 through 7 is intended to illustrate the concepts of the present invention without disclosing classified information.

Summarizing the transmission characteristics discussed above, the present invention enables LEP to be provided for in-band threats that overlap with the peak wavelength range (more preferably, the FWHM wavelength range) of light emitted by the HMD system by blocking such threats with the outer visor 14 and not with the inner visor 16. In-band threats that are not within the peak wavelength range (more preferably, not with the FWHM wavelength range) of light emitted by the HMD system are preferably blocked by the inner visor 16 and not by the outer visor 14 in order to reduce the number of filtering elements that are required to be incorporated into the outer visor 14, which has a much larger surface area than the inner visor 16. The present invention also enables LEP to be provided for out-of band threats (including near IR) without impairing the performance of image enhancement devices located within the protective envelope (inboard) of the outer visor 14 by blocking near IR threats (and preferably all out-of-band threats) with the inner visor 16 and not the outer visor 14.

While there have been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

The invention claimed is:

1. An apparatus for use with a head-mounted device having an image projection device for displaying an image in the visual field of a user, the user having a head and eyes, the image projection device being adapted to emit light having a peak wavelength range and a Full Width Half Maximum (FWHM) wavelength range, the apparatus comprising:
    a first visor including an inner surface and a display surface located on the inner surface, the first visor having a transmittance of less than 1% for light in a first wavelength range, the first wavelength range overlapping with the FWHM wavelength range, the first visor having a deployed position in which the display surface is positioned at least partially within the visual field of the user and is positioned to reflect light emitted from the image projection device, the inner surface facing the eyes of the user when the first visor is in the deployed position; and
    a second visor having a deployed position in which the second visor is positioned at least partially within the visual field of the user and the second visor is positioned between the first visor and the eyes of the user, the second visor having a transmittance of less than 1% for each of a first group of at least one light radiation threat and having an integrated luminous transmittance of at least 20% for light emitted by the image projection device.

2. The apparatus of claim 1, wherein the first wavelength range overlaps with the peak wavelength range.

3. The apparatus of claim 1, wherein each of the first group of at least one light radiation threat has a wavelength range that does not overlap with the peak wavelength range.

4. The apparatus of claim 3, wherein the first group of at least one light radiation threat includes at least one in-band radiation threat.

5. The apparatus of claim 1, wherein each of the first group of at least one light radiation threat has a wavelength range that does not overlap with the FHWM wavelength range.

6. The apparatus of claim 1, wherein the second visor has a smaller surface area than the first visor.

7. The apparatus of claim 1, wherein the image projection device emits light having a peak wavelength range that is between 525 nm and 560 nm.

8. The apparatus of claim 1, wherein the transmittance characteristics of the first visor are independent of the position or orientation of the second visor and the transmittance characteristics of the second visor are independent of the position or orientation of the first visor.

9. The apparatus of claim 1, wherein the second visor comprises at least one filter selected from the group of a multi-layered dielectric filter and a hologram and the first visor includes an absorber dye that attenuates light in the first wavelength range.

10. The apparatus of claim 1, wherein the second visor is part of a pair of eyeglasses.

11. The apparatus of claim 1, wherein the first visor has a transmittance of at least 50% for light in the near infrared wavelength range.

12. The apparatus of claim 11, wherein the second visor has a transmittance of less than 1% for light in the near infrared wavelength range.

13. The apparatus of claim 1, further comprising at least one image enhancement device that is positioned and oriented so that the first visor occupies the field of view of each of the at least one image enhancement device when the first visor is in the deployed position.

14. The apparatus of claim 13, wherein the at least one image enhancement device comprises at least one day/night camera.

15. An apparatus mounted on headwear for displaying an image in the visual field of a user, the user having a head and eyes, the apparatus comprising:
    a first visor having an inner surface, a display surface located on the inner surface, and a deployed position in which the headwear is positioned on the head of the user, the display surface is positioned at least partially within the visual field of the user, the inner surface facing the eyes of the user when the first visor is in the deployed position;

a display system mounted to the headwear that is adapted to emit light having a peak wavelength range and to generate images that are visible to the eyes of the user; and a second visor having a deployed position in which the headwear is positioned on the head of the user, the second visor is positioned at least partially within the visual field of the user, and the second visor is positioned between the first visor and the eyes of the user;

wherein at least 99% of light in an Laser Eye Protection (LEP) matrix is filtered by at least one of the first and second visors, the LEP matrix including a first wavelength range, the first wavelength range having an overlapping portion that overlaps with the peak wavelength range of the display system, the second visor having an integrated luminous transmittance of at least 20% for the light emitted by the display system.

16. The apparatus of claim 15, wherein the first visor has a transmittance of less than 1% in the overlapping portion of the first wavelength range.

17. The apparatus of claim 15, wherein the first visor has a transmittance of at least 50% for light in the near infrared wavelength range.

18. The apparatus of claim 17, wherein the second visor has a transmittance of less than 1% for light in the near infrared wavelength range.

19. The apparatus of claim 15, further comprising at least one image enhancement device that is positioned and oriented so that the first visor occupies a field of view of each of the at least one image enhancement device when the first visor is in the deployed position.

20. The apparatus of claim 16, wherein the at least one image enhancement device comprises at least one day/night camera.

* * * * *

UNITED STATES PATENT AND TRADEMARK OFFICE
CERTIFICATE OF CORRECTION

PATENT NO. : 8,023,195 B2
APPLICATION NO. : 12/256959
DATED : September 20, 2011
INVENTOR(S) : Andrey Vadimovich Alekseyev-Popov and John Fernando Cueva Page 1 of 1

It is certified that error appears in the above-identified patent and that said Letters Patent is hereby corrected as shown below:

Column 10, lines 15 through 17, cancel the text beginning with "20. The apparatus of claim 16," to and ending "one day/night camera." and insert the following text: --20. The apparatus of claim 19, wherein the at least one image enhancement device comprises at least one day/night camera.--

Signed and Sealed this
Twenty-seventh Day of March, 2012

David J. Kappos
*Director of the United States Patent and Trademark Office*